United States Patent [19]

Pethullis

[11] Patent Number: 5,622,467
[45] Date of Patent: Apr. 22, 1997

[54] DISCHARGE MEANS FOR A SILO

[75] Inventor: John K. Pethullis, Holgate, N.Y.

[73] Assignee: Portasilo Limited, United Kingdom

[21] Appl. No.: 494,515

[22] Filed: Jun. 26, 1995

[30] Foreign Application Priority Data

Jul. 5, 1994 [GB] United Kingdom ............... 9413552
Jun. 5, 1995 [GB] United Kingdom ............... 9511302

[51] Int. Cl.$^6$ ............................................. B65G 65/30
[52] U.S. Cl. ........................... 414/304; 414/325; 222/410
[58] Field of Search .................... 414/304, 325; 222/411, 410, 414

[56] References Cited

U.S. PATENT DOCUMENTS

| 217,628 | 7/1879 | Marks et al. ............... 222/411 X |
| 2,574,231 | 11/1951 | Sinden et al. ............... 222/410 X |
| 3,794,215 | 2/1974 | Osterhaus ............... 222/410 X |
| 3,820,688 | 6/1974 | Weiste ............... 222/411 X |
| 3,935,952 | 2/1976 | Banner ............... 414/325 |
| 3,945,537 | 3/1976 | Langen ............... 222/410 X |
| 3,985,244 | 10/1976 | Gessler et al. ............... 414/304 |
| 4,130,225 | 12/1978 | Illes, Jr. ............... 414/304 X |
| 4,150,701 | 4/1979 | Rebucci ............... 414/304 X |
| 4,392,591 | 7/1983 | Fassauer ............... 222/227 |
| 4,415,102 | 11/1983 | Teske ............... 414/304 X |
| 4,506,811 | 3/1985 | Miksitz ............... 222/411 X |
| 5,244,129 | 9/1993 | Poussin et al. ............... 222/410 |

FOREIGN PATENT DOCUMENTS

| 3107966 | 9/1982 | Germany . |
| 3342854 | 6/1985 | Germany . |
| 3503993 | 8/1986 | Germany . |
| 1379634 | 3/1988 | U.S.S.R. ............... 222/410 |
| 443377 | 2/1936 | United Kingdom . |
| 1435644 | 5/1976 | United Kingdom . |
| 2046225 | 11/1980 | United Kingdom . |
| 2217681 | 11/1989 | United Kingdom . |
| 87/01363 | 3/1987 | WIPO . |

*Primary Examiner*—David A. Bucci
*Attorney, Agent, or Firm*—Kelly, Bauersfeld, Lowry & Kelley

[57] ABSTRACT

A discharge mechanism for a silo comprising an entry chamber adapted to be in communication with the silo interior and having a directing member mounted in the entry chamber, for rotary movement about a vertical axis, to direct flowable material in the entry chamber through a discharge passage in a bottom wall of the chamber.

16 Claims, 3 Drawing Sheets

DISCHARGE MEANS FOR A SILO

BACKGROUND OF THE INVENTION

This invention relates to a discharge means for a storage container for flowable material such as freely flowable such as powder or granular material, for example grain, or material of restrictive flowability or cohesive material, for example cement, damp sand, sludges, coagulative, or fibrous materials or the like, hereinafter referred to as a silo.

Hitherto a silo has been provided with a downwardly converging discharge portion which defines an entry chamber in communication with the silo interior and having a generally cone-shaped obstructing member disposed therein to define a ring-shaped discharge passage between the base of the cone shaped member and the converging discharge portion and means being provided to vibrate or otherwise agitate the discharge portion and/or the cone-shaped member to facilitate discharge flow of material through the ring-shaped passage.

Such discharge means suffer from the disadvantage that bridging of the material may occur or, alternatively, material may flow from the centre only, inducing core flow, and either of these disadvantages can lead to inconsistencies in the discharge.

An object of the invention is to provide a new and improved discharge means in or for a silo.

SUMMARY OF THE INVENTION

According to the invention we provide a discharge means in or for a silo comprising an entry chamber adapted to be in communication with the silo interior and having a directing member mounted therein for movement to direct flowable material in the entry chamber through a discharge passage in a wall of the chamber.

The discharge passage may be provided in a bottom wall of the chamber.

The directing member may be mounted in the chamber for rotary movement.

The rotary movement may be about a vertical axis.

The discharge passage may be adjacent the axis of rotation of the rotary member and conveniently surrounds or partially surrounds the axis and further conveniently is generally circular and centred on the axis of rotation of the rotary member.

The directing member may comprise at least one arm having an outer end which projects radially further from the axis of rotation of the rotary member than does an inner part whereby on rotation of the rotary member the arm is adapted to engage flowable material in the chamber and direct the flowable material in a path which has a radially inward component towards the discharge passage in the bottom wall.

The rotary member may have a generally upwardly extending wall having at least one opening therein associated with the or each arm so that the flowable material is directed by the associated arm through the or each associated opening.

The wall may be disposed adjacent to the bottom wall and radially outwardly of the periphery of the discharge passage so as to prevent flowable material entering the discharge passage except through the or each opening in said upwardly extending wall.

The upwardly extending wall may be cylindrical.

Preferably the directing member has a plurality of arms, for example, four.

Preferably the or each arm comprises an upwardly extending wall which may extend perpendicular to the bottom wall when the bottom wall is planar and the or each arm may have a transversely extending portion extending between the upwardly extending wall of the directing member and the arm.

The rotary member may include an obstructing portion to prevent passage of flowable material from the chamber through the discharge passage from above. The obstructing portion may be generally conical extending upwardly and inwardly from a junction with the upwardly extending wall.

The or each opening in the upwardly extending wall of the directing member may be provided with a closure member so as to control discharge through the or each opening.

The or each closure member may be mounted for rotation relative to the directing member so as to be movable from a position in which the or each closure member obstructs and so closes an associated opening and a position in which the or each closure member is disposed inwardly of the upwardly extending wall and circumferentially out of alignment with the opening to permit passage of material therethrough.

The or each closure member may be mounted on a mounting means mounted for rotation about the axis of rotation of the directing member.

The or each closure member may comprise a generally part cylindrical wall carried on an arm extending from the mounting means.

The directing member may be provided with stop means to limit relative rotation between the or at least one of the closure members and the directing member.

Drive means may be provided whereby the mounting means drives the or each closure member about said axis of rotation into engagement with said stop means then to drive the directing member, as a result of said engagement, about said axis of rotation.

The abutment means are positioned so that the closure member or members are not in closing relationship with the openings when in said driving engagement with the abutment means. Rotation of the mounting means in the reverse direction causes relative rotation between the or each closure member and the directing member to bring the closure members into closing relationship with an associated aperture or apertures as a restlit of the directing member remaining stationary during such reverse relative movement.

The mounting means may be adapted to be non-rotatably connected to a driveshaft which is rotatable about the axis of rotation hereinbefore referred to.

The driveshaft may be driven through a gearbox from a transversely extending drive input shaft arranged to be driven by a motor or other suitable drive means.

The entry chamber may be provided by a converging discharge portion which may of frusto-conical configuration.

The discharge means may further comprise an exit portion disposed below the bottom wall of the chamber.

Said drive means may be carried by the exit portion and the closure member and directing member may be driven by a transversely extending driveshaft drivably engaged with said drive means carried by the exit means.

Alternatively, said drive means may be carried by said bottom wall of the chamber and the closure member and thus the directing member may be driven by a transversely extending drive shaft drivably engaged with said drive means carried by the bottom wall.

The exit portion may comprise a further converging portion which may be of frusto-conical configuration having a smaller circular opening in its lower, smaller diameter, end. The bottom wall of said chamber may be provided by a wall member having a portion sandwiched between flanges provided at the bottom end of the converging portion of the entry chamber and the larger diameter end of the exit portion.

BRIEF DESCRIPTION OF THE DRAWINGS

Two examples of the invention will be described with reference to the accompanying drawings wherein.

DESCRIPTION OF THE PREFERRED EMBODIMENTS

Figure 1:
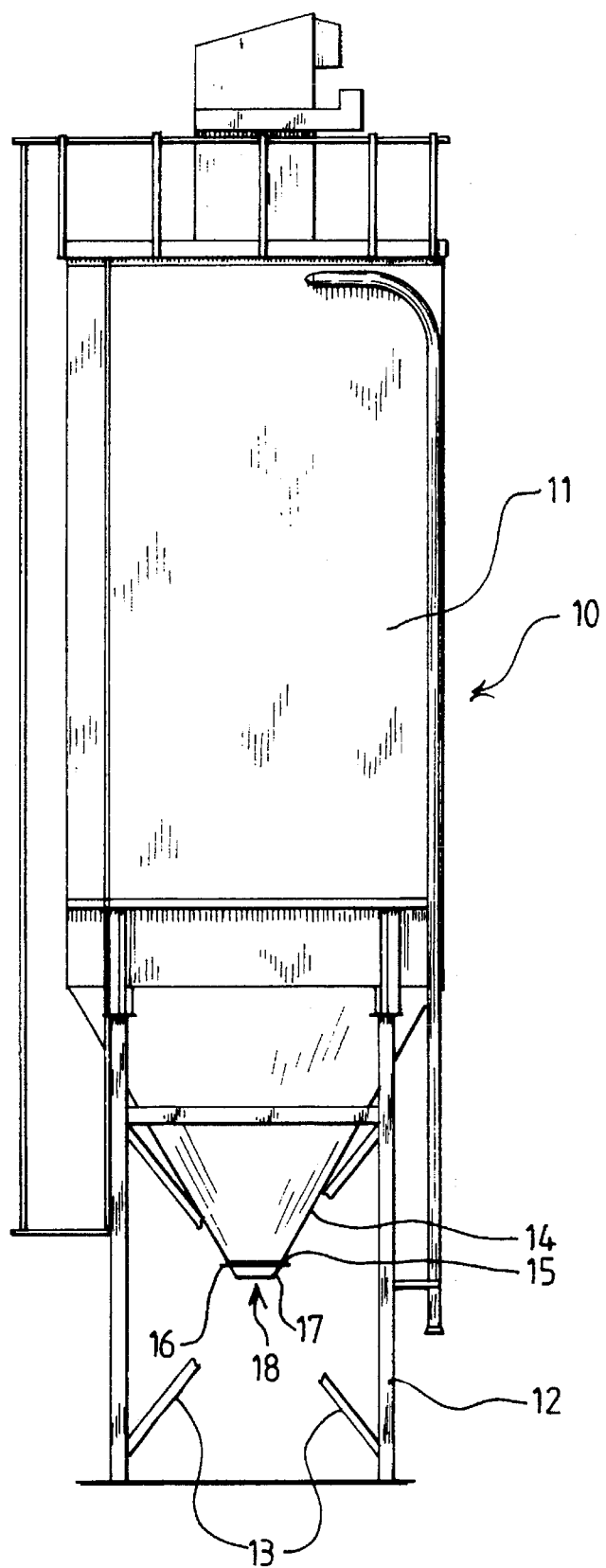
FIG. 1 is a side elevation of a silo embodying the invention.
Figure 2:
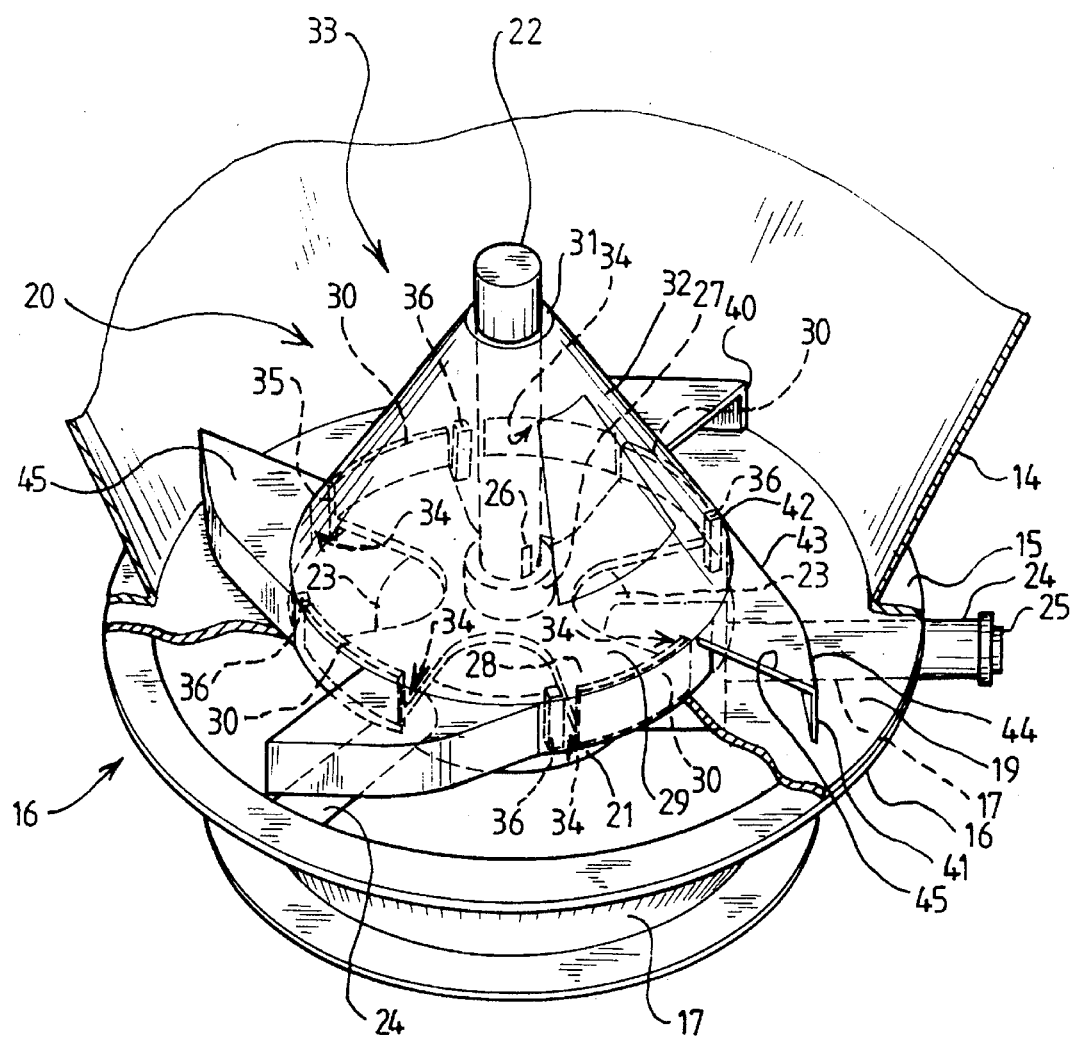
FIG. 2 is a fragmentary perspective view with parts omitted, and to an enlarged scale, of the discharge means of the silo of FIG. 1.

Referring to FIGS. 1 and 2, a silo for flowable or cohesive material such as grain, cement, damp sand, sludges, coagulative, fibrous materials or the like is indicated generally at 10 in FIG. 1 and comprises a main container part 11 of generally cylindrical configuration supported on a leg structure 12 with cross-braces 13. At the lower end of the generally cylindrical main container part 11 is a frusto-conical discharge portion 14 having at its lower end an outwardly extending annular flange 15 to which is bolted an outwardly extending annular flange 16 of an exit portion 17 of a discharge means 18.

The discharge portion 14 together with an annular plate 19 clamped between the flanges 15 and 16 defines an entry chamber 20 which is in communication with the main interior 11 of the silo 10 and of which the plate 19 provides a bottom wall.

The plate 19 has a central circular aperture 21 which provides a discharge passage from the chamber 20.

Disposed centrally within the discharge passage 21 is an axle 22 provided with a bevel gear, not shown, at its lower end in a gearbox 23 carried by tubular struts 24 welded to the exit portion 17. Also provided within a gearbox housing 23 for meshing engagement with the bevel gear on the shaft 22 is a further bevel gear which is rotatably connected to a drive input shaft 25 rotatably mounted within one of the three struts 24 and adapted to be rotated by a drive motor, not shown.

Keyed to the shaft 22 by a key 26 is a mounting member 27 connected to a spider 28 having four arms 29 which at their outer ends carry part cylindrical closure members 30.

At its upper end the shaft 22 has the upper end 31 of a generally frusto-conical obstructing member portion 32 of a directing member 33 rotatably mounted thereon. The directing member 33 has, at the lower, larger diameter, end of the frusto-conical part 32 a generally cylindrical wall 34 which rests on the plate 19 adjacent to and spaced outwardly of the aperture 21 therein and extending upwardly relative thereto. The wall 34 is provided with four generally rectangular apertures 35 and adjacent the one ends of each aperture 35 is provided a stop element 36 which projects radially inwardly.

Associated with each aperture 35 is a directing arm 40 having an outer free end 41 which is spaced radially further from the axis 22 than the radially inner end 42 thereof. Each arm 41 has an inner part 43 of generally rectilinear generally chordal configuration and an outer part 44 connected thereto by a curved portion. The wall 41 is connected, at its upper end, to the upper end of the generally cylindrical wall 34 by a closure plate 45.

In use, when it is desired to discharge material from the main body 11 of the silo 10, the input drive shaft 25 is driven to rotate the shaft 22 in a clockwise direction as shown in FIG. 2. When the shaft 22 is rotated clockwise the key 26 causes the spider 28 to rotate to cause the closure member to engage the abutments 36 thus initially to move the closure members 30 out of closing relationship with the apertures 35 and then, when they engage the abutments 36, into driving engagement with the directing member 33 to cause it to rotate clockwise.

As a result, the flowable material within the input chamber 20 is directed by the generally funnel shaped configuration provided by the walls 40, 45 and 19, into and through the apertures 35 and then due to gravity through the spaces between the arms 28 and through the discharge aperture 21.

When it is desired to stop the flow of flowable material the direction of rotation of the input drive is reversed so that the shaft 22 is rotated in an anti-clockwise direction in FIG. 2 and this causes the closure members 30 to rotate anti-clockwise relative to the directing member to cause the closure members 30 to obturate and so close the openings 35 to prevent any flow of flowable material therethrough.

Figure 3:
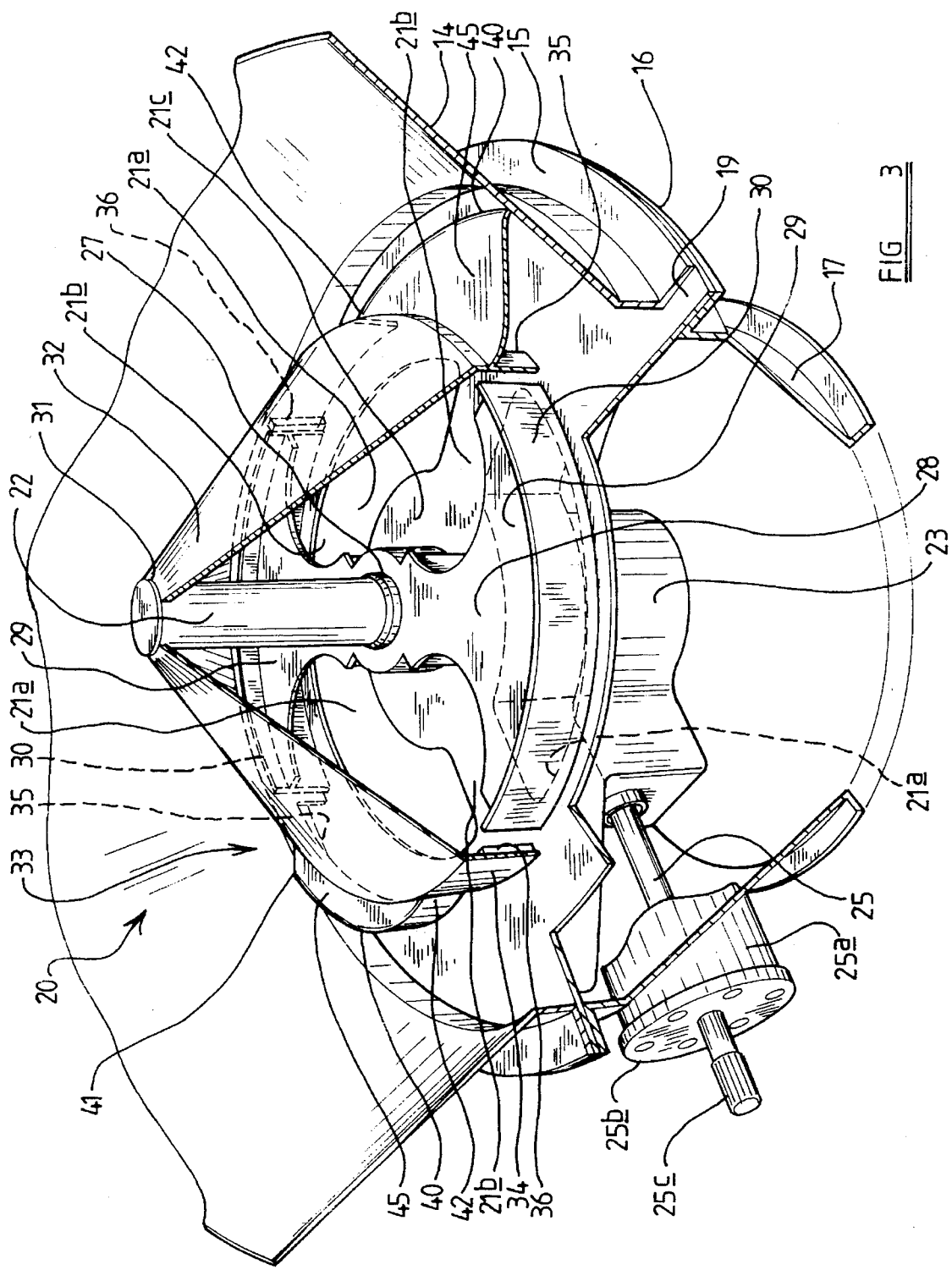
FIG. 3 is a fragmentary perspective view with parts omitted of an alternative discharge means.

Referring now to FIG. 3, in which the same reference numerals have been used to refer to corresponding parts as were used in FIG. 2.

FIG. 3 shows an alternative discharge means which is essentially similar to that illustrated in FIGS. 1 and 2, but in which the plate 19, instead of having a central circular aperture 21, has three symmetrically disposed part annular apertures 21a so that the plate has three radial arms 21b between the apertures and a central, generally circular hub part 21c. Mounted below the hub part 21c is a gearbox 23 in which an axle 22 is rotatably mounted by means of thrust and journal bearings, not shown. The lower end of the axle 22 has a bevel gear, not shown, for meshing engagement with a further bevel gear, not shown, within the gearbox, which is rotatably connected to a drive input shaft 25 which extends radially relative to the axis of rotation of the axle 22 within a tube 25a that extends through an aperture in the wall of the exit portion 17 and has a flange 25b on which a bearing, not shown, for the outer end of the shaft 25, can be mounted. At its outer end the shaft 25 has a splined portion 25c for connection to a drive motor. A flexible tubular cover is provided between the tube 25a and the gearbox 23 to allow for any misalignment of the tube 25a with the gearbox 23.

Keyed to the shaft 22 by a key, not shown, is a mounting member 27 connected to a spider 28 having two arms 29 which at their outer ends carry part cylindrical closure members 30.

At its upper end the shaft 22 has the upper end 31 of a generally frusto-conical obstructing member portion 32 of a directing member 33 rotatably mounted thereon. The directing member 33 has, at the lower, larger diameter, end of the frusto-conical part 32 a generally cylindrical wall 34 which rests on the plate 19 adjacent to and spaced outwardly of the apertures 21a therein and extending upwardly relative thereto. The wall 34 is provided with two generally rectangular apertures 35 and adjacent the one ends of each aperture 35 is provided a stop element 36 which projects radially inwardly.

Associated with each aperture 35 is a directing arm 40 having an outer free end 41 which is spaced radially further from the axis 22 than the radially inner end 42 thereof. Each arm 41 is of curved configuration. The wall 41 is connected, at its upper end, to the upper end of the generally cylindrical wall 34 by a closure plate 45.

In use, when it is desired to discharge material from the main body 11 of the silo 10, the input drive shaft 25 is driven to rotate the shaft 22 in a clockwise direction as shown in FIG. 3. When the shaft 22 is rotated clockwise the key causes the spider 28 to rotate to cause the closure member to engage the abutments 36 thus initially to move the closure members 30 out of closing relationship with the apertures 35 and then, when they engage the abutments 36, into driving engagement with the directing member 33 to cause it to rotate clockwise.

As a result, the fl. owable material within the input chamber 20 is directed by the generally funnel shaped configuration provided by the walls 40, 45 and 19, into and through the apertures 35 and then due to gravity through the spaces between the arms 28 and through the discharge apertures 21a.

When it is desired to stop the flow of flowable material the direction of rotation of the input drive is reversed so that the shaft 22 is rotated in an anti-clockwise direction in FIG. 3 and this causes the closure members 30 to rotate anti-clockwise relative to the directing member to cause the closure members 30 to obturate and so close the openings 35 to prevent any flow of flowable material therethrough.

The features disclosed in the foregoing description, or the following claims, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

I claim:

1. A discharge means for a silo comprising an entry chamber adapted to be in communication with the silo interior and having a directing member mounted in the entry chamber, for rotary movement about a vertical axis to direct flowable material in the entry chamber through a discharge passage in a bottom wall of the chamber, the directing member comprising at least one arm having an outer end which projects radially further from the axis of rotation of the rotary member than does the inner part whereby on rotation of the rotary member the arm is adapted to engage flowable material in the chamber and to direct the flowable material in a path which has a radially inward component towards the discharge passage in the bottom wall, the rotary member having a generally upwardly extending wall having at least one opening therein associated with the or each arm so that the flowable material is directed by the associated arm through the or each associated opening, the or each opening in the upwardly extending wall of the rotary member being provided with a closure member so as to control discharge through the or each opening.

2. A discharge means according to claim 1 wherein the discharge passage is adjacent the axis of rotation of the rotary member and at least partially surrounds the axis.

3. A discharge means according to claim 1 wherein the discharge passage has a periphery and the wall is disposed adjacent to the bottom wall and radially outwardly of the periphery of the discharge passage so as to prevent flowable material entering the discharge passage except through the or each opening in said upwardly extending wall.

4. A discharge means according to claim 1 wherein the directing member has a plurality of arms.

5. A discharge means according to claim 1 wherein said at least one arm comprises an upwardly extending portion and a transversely extending portion.

6. A discharge means according to claim 1 wherein the directing member includes an obstructing portion to prevent passage of flowable material from the chamber through the discharge passage from above.

7. A discharge means according to claim 6 wherein the obstructing portion is generally conical extending upwardly and inwardly from a junction with the upwardly extending wall.

8. A discharge means according to claim 1 wherein the or each closure member is mounted for rotation relative to the directing member so as to be movable from a position in which the or each closure member obstructs and so closes an associated opening and a position in which the or each closure member is disposed inwardly of the upwardly extending wall and circumferentially out of alignment with the opening to permit passage of material therethrough.

9. A discharge means according to claim 8 wherein the or each closure member is mounted on a mounting means mounted for rotation about the axis of rotation of the directing member.

10. A discharge means accordling to claim 9 wherein the directing member is provided with stop means to limit relative rotation between the or at least one of the closure members and the directing member.

11. A discharge means according to claim 10 wherein drive means are provided whereby the mounting means drives the or each closure member about said axis of rotation into engagement with said stop means then to drive the directring member, as a result of said engagement, about said axis of rotation.

12. A discharge means according to claim 11 wherein the stop means are positioned so that the closure member or members are not in closing relationship with the openings when in said driving engagement with the stop means.

13. A discharge means according to claim 9 wherein the mounting means is adapted to be non-rotatably connected to a driveshaft which is rotatable about the axis of rotation.

14. A discharge means according to claim 13 wherein the driveshaft is driven through a gearbox from a transversely extending drive input shaft adapted to be driven by a motor or other suitable drive means.

15. A discharge means according to claim 11 wherein said drive means is carried by said bottom wall of the chamber and the closure member is driven by a transversely extending drive shaft drivably engaged with said drive means carried by the bottom wall.

16. A discharge means according to claim 1 wherein the bottom wall of said chamber is provided by a wall member having a portion sandwiched between flanges provided at the bottom end of a converging portion of the entry chamber and a larger end of an exit portion disposed below the bottom wall of the chamber.

* * * * *